Figure 1:
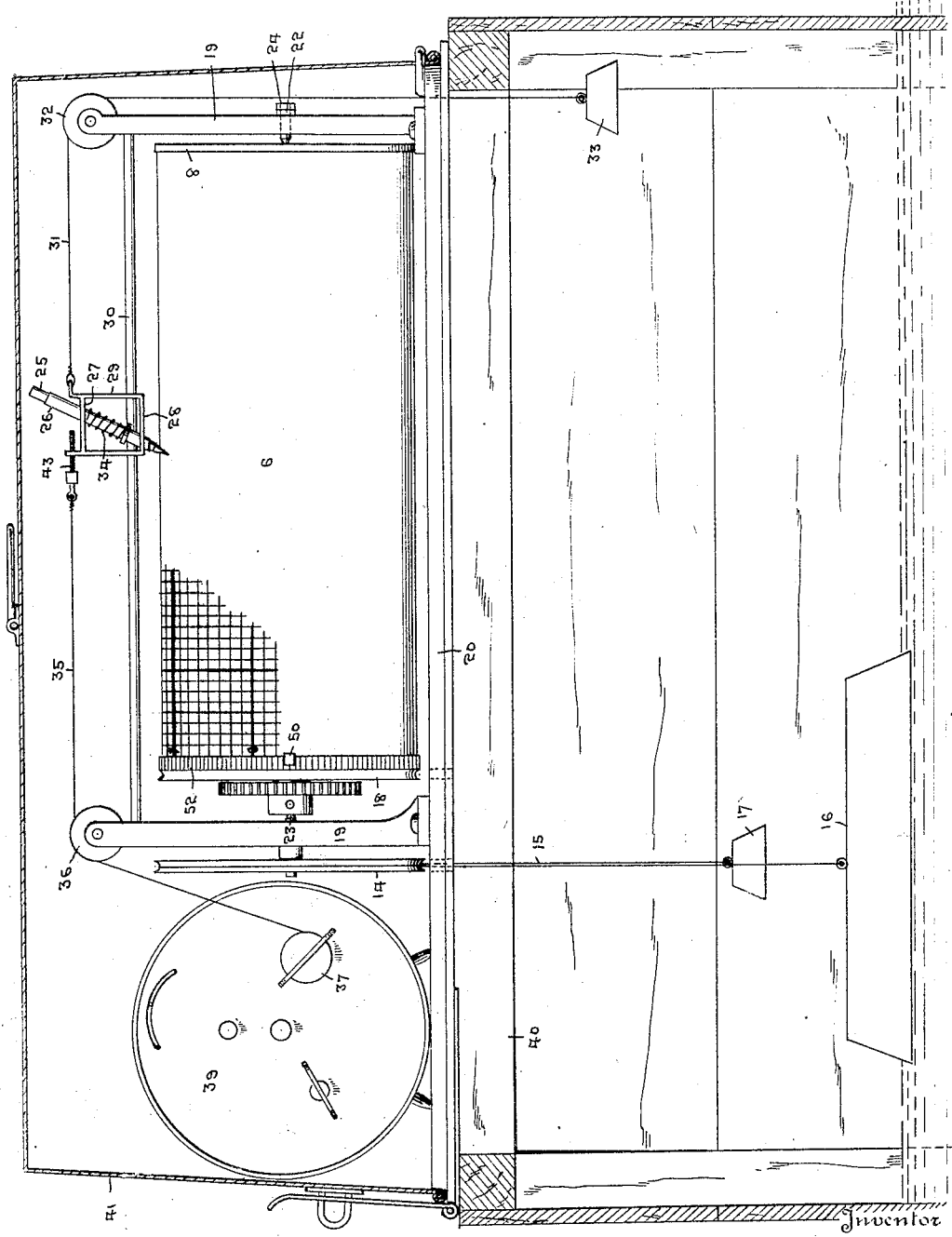

W. N. McCONNEL.
WATER STAGE RECORDER.
APPLICATION FILED JAN. 4, 1915.

1,197,943.

Patented Sept. 12, 1916.
2 SHEETS—SHEET 1.

Witnesses

Inventor
W. N. McConnel
By
Attorney

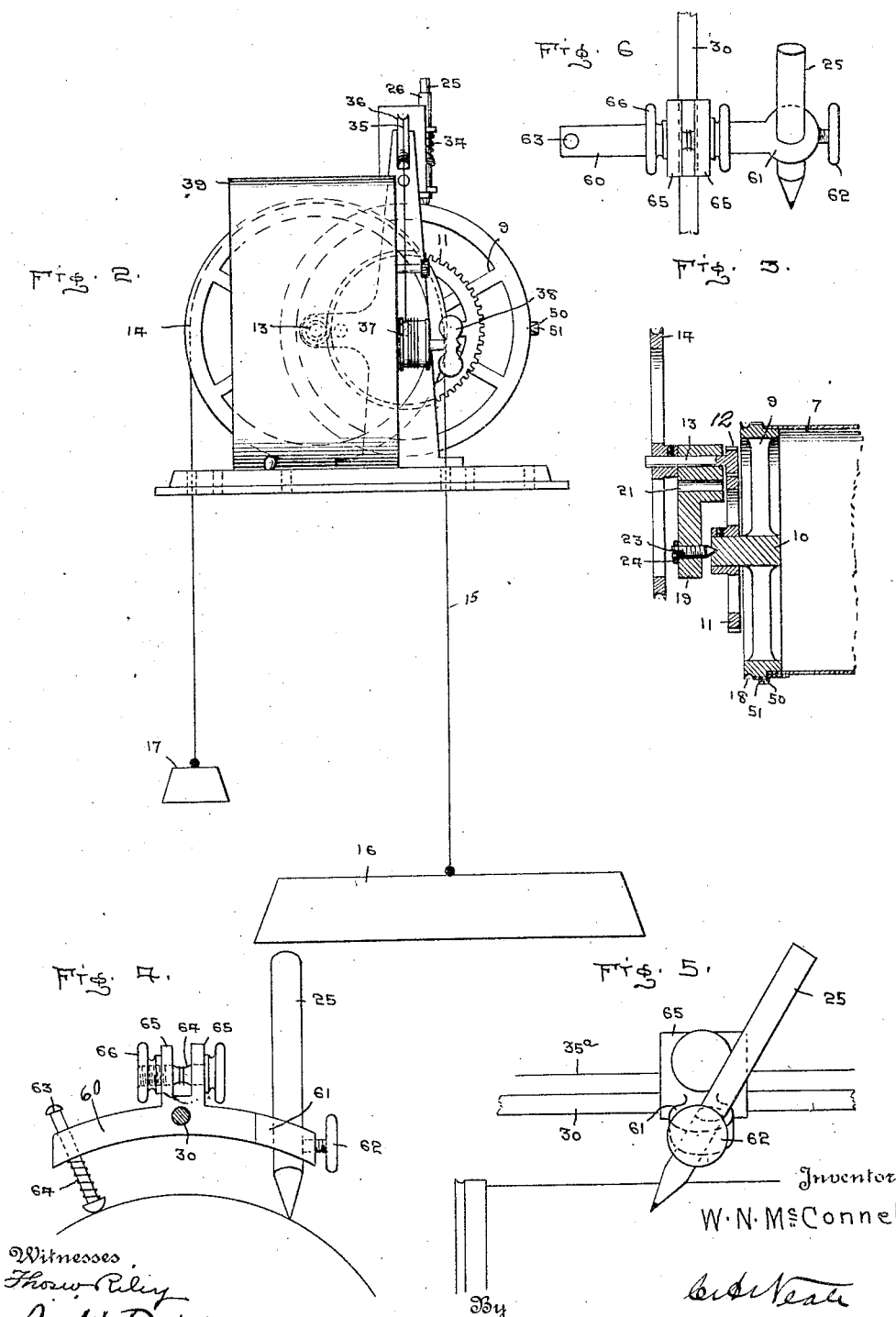

ered with a recess 52 in the spider.

UNITED STATES PATENT OFFICE.

WILLIAM N. McCONNEL, OF BOISE, IDAHO.

WATER-STAGE RECORDER.

1,197,943.

Specification of Letters Patent.   Patented Sept. 12, 1916.

Application filed January 4, 1915.   Serial No. 359.

*To all whom it may concern:*

Be it known that I, WILLIAM N. McCONNEL, a citizen of the United States, residing at Boise, in the county of Ada and State of Idaho, have invented certain new and useful Improvements in Water-Stage Recorders, of which the following is a specification.

This invention is a float-operated recording instrument, designed to make a record of water heights according to time divisions, showing variations of such heights during a stated period of time, the marker which makes the record on the record sheet being controlled by a clock, for the purpose of providing a record which can be easily read and understood.

The device will be found particularly useful in connection with irrigating systems, to indicate changes in water levels, but may be applied or used to indicate tides and record the variations thereof; to indicate the depths of streams at various times; the amount of rainfall in a given time, or for any other use where it is desired to make a record of varying water heights according to time divisions.

The advantages of the construction and operation of the recorder will be evident from the following description and the accompanying drawings, in which—

Figure 1 is a side elevation of the instrument showing the same supported above a body of water; Fig. 2 is an end elevation of the instrument; Fig. 3 is a detail in section of the gearing and drum which carries the record sheet; Fig. 4 is an end elevation; Fig. 5 is a side elevation, and Fig. 6 is a top plan of a modification showing a different form of pencil carrier.

Referring specifically to the drawings, 6 indicates a record sheet which is placed upon the drum 7, the sheet being ruled lengthwise to indicate height divisions in feet or inches, and ruled circumferentially to indicate time divisions. This sheet is wound around the drum and may be removed and renewed at intervals. The drum is supported at one end by a ring spider 8 and at the opposite end by a ring spider 9, the latter having a stub shaft 10 provided with a gear 11 which meshes with a pinion 12, the shaft 13 of which carries a grooved wheel 14 over which passes a wire 15 connected at one end to a float 16 and at the other end to a counterweight 17. As the float rises and falls the drum will be turned.

The reducing gearing that I have employed is 1 to 10, but it may be of any ratio desired, or it may be omitted, and the wire applied to the rim 18 of the spider 9.

The drum is supported between standards 19 which are mounted on a base plate 20, the support 19 at the left also carrying the bearing piece 21 for the reducing gearing. The drum is adjustably held between the standards by means of screw pivots 22 and 23 which may be fastened at adjustment by lock nuts 24, and the base plate is provided with apertures in vertical alinement with the grooved rim 18 and the grooved wheel 14 for the passage of the wire 15 connecting the float and counterweight, as indicated in dotted lines in Fig. 1.

The marker conveniently consists of a pencil 25 mounted in a tube 26 which is supported in openings in the upper and lower plates 27 and 28 of a frame 29 which is slidable on a rod 30 extending lengthwise above the drum between the standards 19. A wire 31 is connected to one end of the frame and passes over a pulley 32 to connection with a weight 33 tending to pull the frame and marker to the right. A spring 34 is coiled around the pencil holder to hold the point of the pencil against the record sheet. On the opposite side the frame is connected by a wire 35, which passes over a pulley 36, to a drum 37 mounted on the winding arbor 38 of a clock 39. When the clock is wound, the pencil carrier is drawn to the left end of the record sheet, and as the arbor turns when the clock is running the wire is unwound from the drum and the weight 33 pulls the marker toward the opposite end of the record sheet.

The instrument may be mounted on a platform 40 above a body of water on which the float rests, and a cover 41 may be provided to inclose the same, and locked to prevent tampering therewith.

It is desirable to set the recorder on the drum at a certain gage height of water before the instrument begins to operate, and for this purpose the drum 7 may be turned upon or with respect to the spider 9, to bring the desired longitudinal or height line on the record in registry with the marker. Therefore the drum may be turned to set the same, and when in desired position it is held by means of a spring clip 50 which is fastened to the drum and has a point 51 engageable in any one of a series of notches 52 formed in the raised rim of the spider 9, and when so set the clip holds the parts 7 and 9 so that they will thereafter rotate together.

It is also desirable or necessary that the point of the pencil, at the start, be set exactly on one of the circular time lines on the record. When the clock is wound there is usually a slight erroneous positioning of the pencil incident to the distance between the teeth on the ratchet of the winding arbor of the clock which ratchet is caught by a dog in the usual manner, and to correct any error in this respect, and to position the pencil point exactly on the first line of the record sheet, the wire 35 is connected to the frame 29 by means of a swivel screw 43. After the clock is wound, this screw can be turned to let out or take up enough wire to locate the pencil point exactly on the time line.

The modification shown in Figs. 4, 5 and 6 relates especially to the pencil carrier which slides on the rod 30. It comprises a cross piece 60 with a hole for the rod 30. One end of this cross piece is provided with an enlargement 61 with an opening through which the pencil 25 fits. This opening extends at an inclination so that the pencil will set at an angle longitudinally to pass over the record sheet without catching or tearing the same as it would be apt to do if set perpendicular to the surface. The pencil is held by a thumb screw 62. Also, the pencil is held out to one side of the direct vertical line between the center of the drum and the rod 30, so that the pencil point is presented at an angle transversely, whereby it will ride over the lapped end of the record sheet as the sheet revolves in the direction shown by the arrow in Fig. 4 and thus will not catch on the lapped edge. The sheet is conveniently held on the drum by wrapping the same around the drum and lapping and pasting its ends. On the opposite side of the piece 60 it is provided with a headed pin 63 which is set radially with respect to the drum and held in contact therewith by a spring 64 with sufficient pressure to hold the point of the pencil to the surface of the sheet, the piece 60 being free to rock slightly so that the pencil will follow slight irregularities of the surface. The wire 35ª consists of one piece which is connected at one end to the drum 37 and at the other end to the weight 33, and is wound or wrapped around in a groove in a pin 64 which is supported by two lugs 65 on the cross-piece 60. This pin has a screw nut 66 to tighten the same. To set the pencil exactly on the time line, the pin 64 may be turned to adjust the carrier one way or the other, after which it is fixed by tightening the nut 66. This adjustment is quickly and easily made, and inasmuch as the tension on the wire 35ª at both sides of the pin is practically the same, there is no danger of the wire slipping on the pin.

In operation, the drum is first set by loosening the clip 50 and turning the same to bring the desired height line to register with the pencil. The clock is then wound which winds the wire on the drum 37 and draws the pencil to the beginning or left end of the drum. The pencil is then adjusted by the means described to register the same exactly with the first time line. Then the rise and fall of the float will turn the drum according to variations in the water level, and as the clock runs the wire unwinds from the drum and the weight 33 draws the pencil over the surface of the record sheet, giving a mark thereon according to the two factors of time and height. A record will thus be made showing the variations in the water level during the time the clock runs. An ordinary clock may be used by simply soldering a winding drum on the winding arbor, and the record sheet may be changed as often as necessary.

I claim:

1. In a water stage recorder the combination with a float operated rotary record drum and a guide extending along the drum, of a clock operated winding drum, a carrier movable along the drum and provided with a marker for the record, means other than the clock operated winding drum tending to pull the carrier along the guide, and a flexible connection between the winding drum and the carrier to control the movement of the carrier.

2. In a recorder the combination with a float operated movable record sheet, of a carrier, clock mechanism, means other than the clock mechanism tending to move the carrier across the sheet, a flexible connection between the clock mechanism and the carrier, and adjusting means to vary the position of the carrier with relation to the clock.

3. In a recorder the combination with a float-operated movable record sheet, of a carrier and marker, a clock mechanism, means other than the clock mechanism tending to move the carrier across the sheet, a flexible connection between the clock mechanism and the carrier, and means for adjusting the length of the flexible connection to vary the position of the carrier with respect to the clock.

4. In a recorder, the combination with a record sheet, of a carrier, a clock mechanism, a marker carried by the carrier and adapted to mark the sheet, means tending to move the carrier in one direction across the sheet, and means governed by the clock and connected to the carrier to retard such movement according to the clock operation.

5. In a recorder, the combination with a record sheet, of a carrier, a clock mechanism, a marker carried by the carrier and adapted to mark the sheet, means tending to move the carrier in one direction across the sheet, and means governed by the clock and connected to the carrier to permit such movement according to the clock operation, said means including a winding drum and a flexible connection therefrom to the carrier, said connection being adjustable to exactly position the marker initially with respect to the sheet.

6. In a recorder the combination of an actuated rotatable spider, a record-sheet drum secured at one end to a suitably journaled spider and supported at its other end for rotary adjustment upon the actuated spider, a marker movable longitudinally of the drum, and means to lock the drum to the actuated spider after rotary adjustment.

7. In a recorder, the combination with a float and counterweight, of a record-sheet drum secured at one end to a circular spider suitably journaled and supported at its other end for rotary adjustment upon a float-controlled spider suitably journaled, a marker adapted for time controlled movement longitudinally of the drum, and means to lock the drum to the float controlled spider to properly position the marker relatively to the record sheet.

8. In a recorder, the combination with a record drum, of a guide extending along the same, a cross piece pivotally mounted and slidable on said guide, a marker carried by said cross piece and bearing against the drum at one side of the guide, and a spring-pressed member carried by said cross-piece and bearing against the drum at the opposite side of the guide.

9. In a recorder, the combination with a record drum, of a guide extending along the same, a marker carrier slidable on said guide, a wire adjustably connected to the carrier and extending in opposite directions therefrom, a weight connected to one end of the wire, and a clock-controlled device connected to the opposite end of the wire.

10. In a recorder, the combination with a record sheet, of a marker carrier movable across the same, means tending to move the carrier in one direction, and a clock-controlled let-off device connected to the carrier and adapted to permit such movement thereof according to the clock operation.

11. In a water-stage recorder, the combination with a float-operated rotary record drum, a guide extending parallel with the drum, a carrier movable on the guide and provided with a marker for the record, means tending to pull the carrier along the guide, and a time mechanism, of a winding drum rotated by the winding arbor of the time mechanism and provided with a flexible connection to the carrier.

In testimony whereof I affix my signature in presence of two witnesses.

WILLIAM N. McCONNEL.

Witnesses:
W. G. STEWARD,
D. J. PAUL.